United States Patent [19]
Suzuki

[11] Patent Number: 6,131,882
[45] Date of Patent: Oct. 17, 2000

[54] BUTTERFLY VALVE

[75] Inventor: Yoshikazu Suzuki, Shizuoka-ken, Japan

[73] Assignees: NBS Co., Ltd., Shizuoka-ken; Kazuhiro Miyairi, Kanagawa-ken, both of Japan

[21] Appl. No.: 08/768,453

[22] Filed: Dec. 18, 1996

[30] Foreign Application Priority Data

Dec. 19, 1995 [JP] Japan .................................. 7-348691

[51] Int. Cl.⁷ .............................................. F16K 1/226
[52] U.S. Cl. ........................................ 251/306; 251/305
[58] Field of Search ................................ 251/305, 306

[56] References Cited

U.S. PATENT DOCUMENTS

| | | | |
|---|---|---|---|
| 2,095,263 | 10/1937 | Moss | 251/305 X |
| 2,662,545 | 12/1953 | Kelley | 251/305 X |
| 3,176,704 | 4/1965 | De Palma | 251/305 X |
| 3,960,177 | 6/1976 | Baumann | 251/305 X |
| 4,281,817 | 8/1981 | Adams et al. | 251/305 |
| 4,296,915 | 10/1981 | Baumann | 251/305 X |
| 4,712,768 | 12/1987 | Herr et al. | 251/305 |
| 4,796,857 | 1/1989 | Hayes et al. | 251/306 X |
| 5,102,097 | 4/1992 | Davis et al. | 251/305 X |

*Primary Examiner*—John Fox
*Attorney, Agent, or Firm*—McDermott, Will & Emery

[57] ABSTRACT

A butterfly valve comprising a cylindrical valve body (1), a sheet ring (5) fitted into the inner periphery of the valve body (1), and a discoid valve discoid valve disk (3) for opening or closing the valve. When the valve is opened by rotating the valve disk (3), a gap forms at the half of the valve disk (3) that is rotated downstream between the sheet ring (5) and the sealing surface (3c) of the valve disk (3). The gap between the sheet ring (5) and the sealing surface (3c) of the valve disk (3) expands and a second gap is formed at the half of the valve disk (3) that is rotated upstream between the sheet ring (5) and the sealing surface (3c) as the valve disk (3) further opens. The sheet ring (5) is not influenced by turbulent flow produced due to a narrowed channel (4) because the sheet ring (5) is positioned to the upstream side of a position where the channel (4) is most narrowed when a valve opening rate is approximately 15% in which the load applied to the sheet ring (5) due to fluid is maximized. Thereby, a butterfly valve can be obtained which has characteristic capable of precisely controlling a flow rate of 10% or less of the total flow rate.

2 Claims, 9 Drawing Sheets

BUTTERFLY VALVE

BACKGROUND OF THE INVENTION (1) Field of the Invention

The present invention relates to a butterfly valve for opening or closing a channel of fluid flowing at a high pressure in a facility for handling the fluid through a pipeline. More particularly, the present invention relates to a butterfly valve whose flexible sheet ring is not damaged by an excessive load due to the flow of a high-pressure high-speed fluid produced immediately before a valve disk is closed or immediately after the valve disk is opened and moreover, which makes it possible to control a very small amount of the fluid when the flow rate of the fluid is not more than 30% of the maximum flow rate (when the valve is fully opened), particularly not more than 10% of the maximum flow rate.

(2) Description of the Prior Art

Figure 11A:
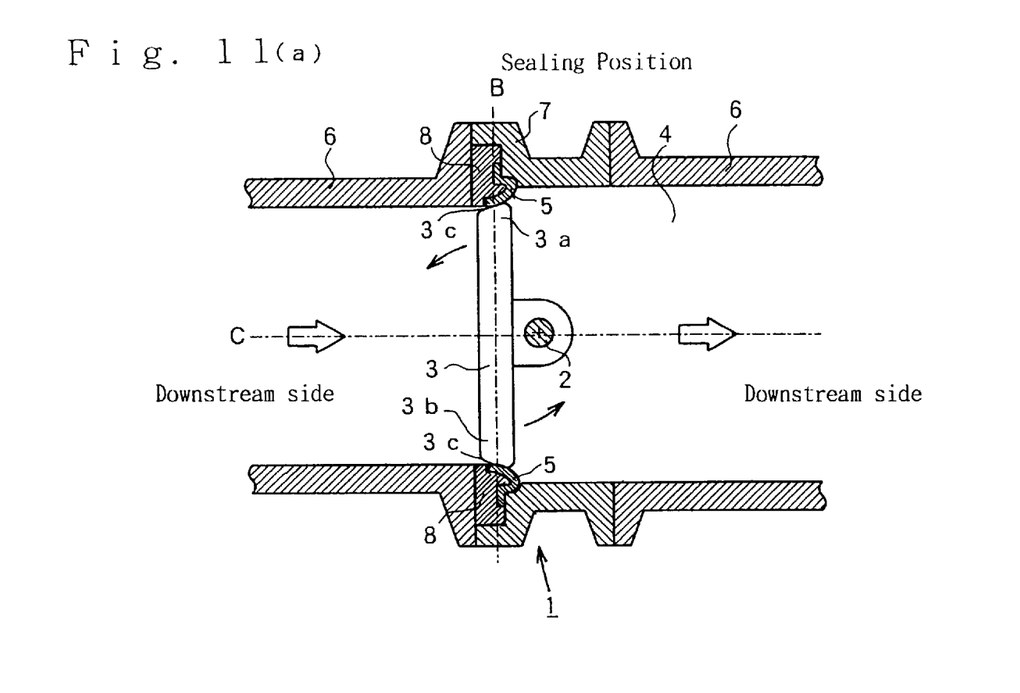
FIGS. 11(a) and 11(b) are sectional views of a conventional valve.
Figure 11B:
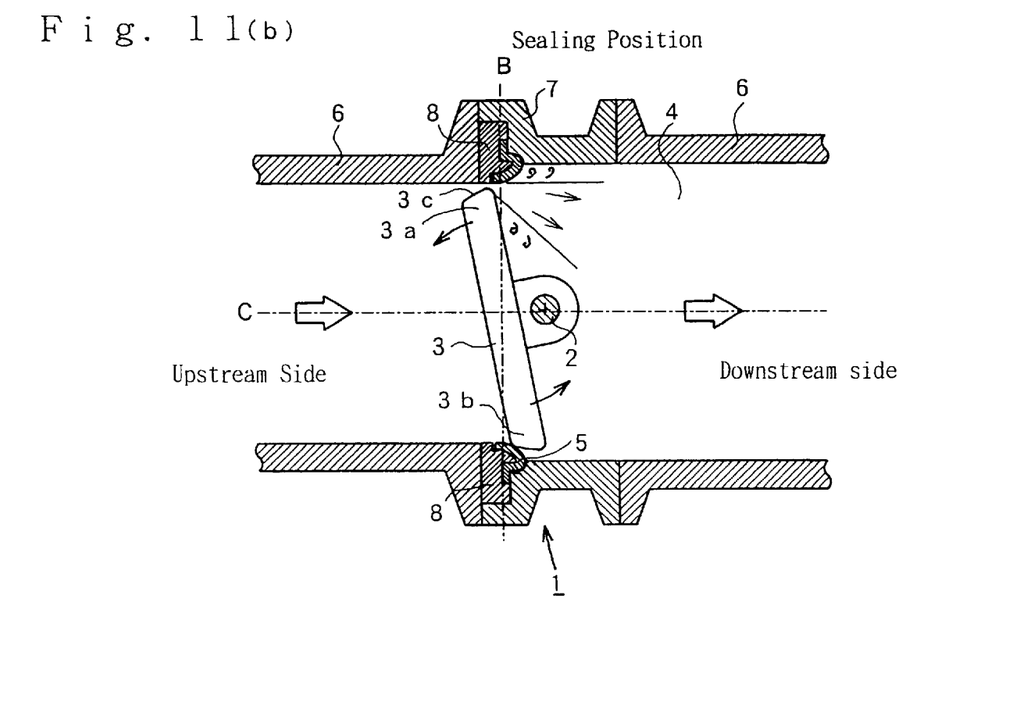

For a general butterfly valve, a vertical shaft 2 is set to a short cylindrical valve body 1 in which fluid flows from the primary side (upstream side) toward the secondary side (downstream side) by slightly shifting the center of the shaft 2 from the center line C of the valve body 1 in the case of a double eccentric structure as shown in FIG. 11. A discoid valve disk 3 is secured to the shaft 2 to open or close a channel 4 of the valve body 1 by rotating the valve disk 2 about the shaft 2. To improve the airtightness of the valve disk 3, a sheet ring 5 is fitted into the inner periphery of the channel 4.

To open the butterfly valve by rotating the valve disk 3, one side 3a of the valve disk 3 is rotated toward the upstream side so as to go against the flow direction of the fluid and the other side 3b of the valve 3 is rotated toward the downstream side so as to follow the flow direction of the fluid as shown in FIG. 11(*b*). Then, in the case of the double eccentric structure, a gap is formed from the other side 3a of the valve disk 3 and thereby opening starts, the gap gradually expands toward the other side 3b of the valve disk 3, and finally the lateral end of the other side 3b separates. To close the butterfly valve, the above procedure is reversed.

In the process of opening or closing the butterfly valve, the speed of the fluid flowing through the channel 4 gets lowest when the valve disk 3 is fully opened (approx. 90°) and gets highest immediately after opening starts or immediately before closing starts as shown in FIG. 11(*b*).

Figure 7:
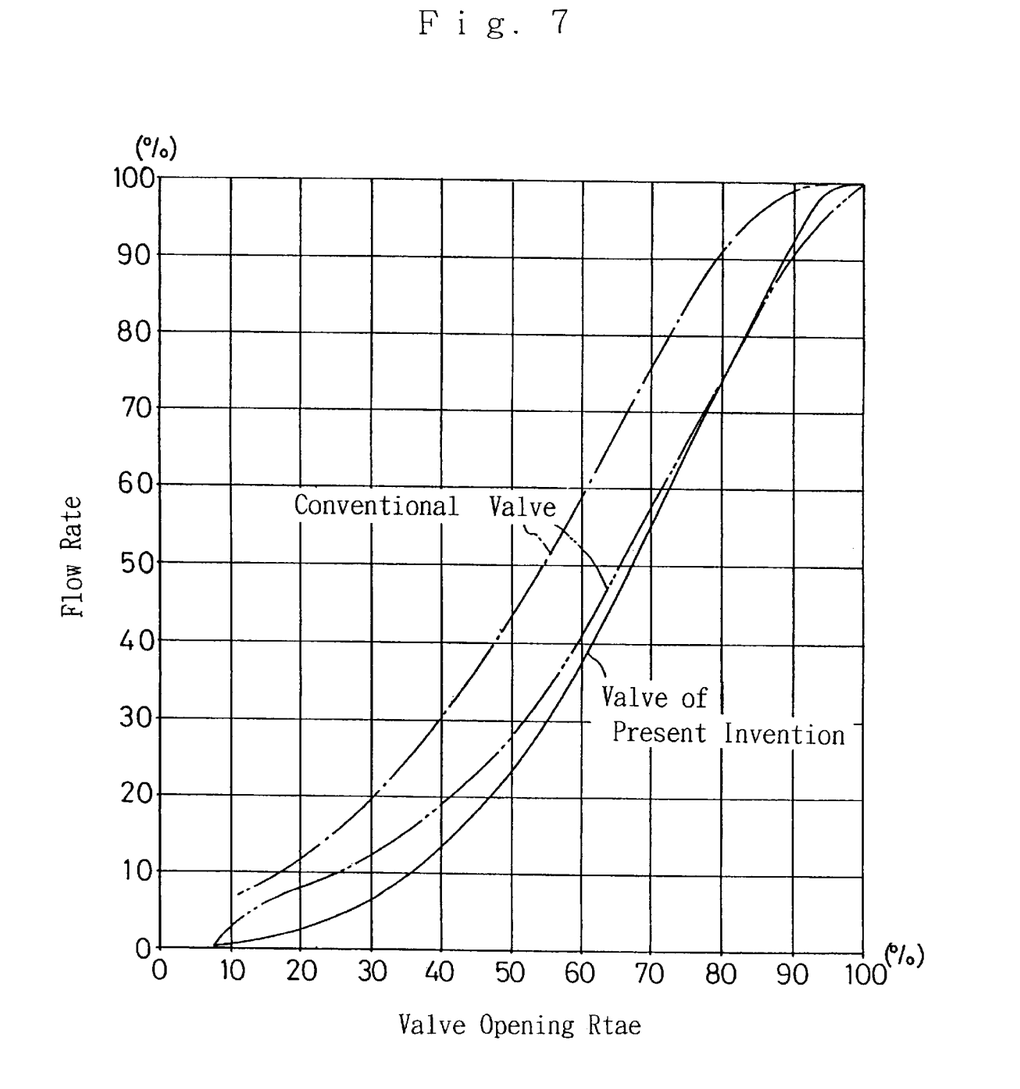
FIG. 7 is a characteristic diagram showing the flow rate characteristic of the valve of the first embodiment of the present invention and a conventional valve.

In the case of a conventional butterfly valve, the change of flow rate is larger than the change of valve opening rate over the entire valve opening rate like the characteristic curves shown by an alternate long and short dash line in FIG. 7 and moreover, the flow rate comes to 0 at an opening rate of 5 to 10%. Therefore, there are problems that fine control of a flow rate of 10% or less is difficult and a flow rate of 5% or less can hardly be controlled.

This is because the flow velocity of the fluid extremely increases when the valve opening rate is 20% or less and the sheet ring 5 is deformed due to the load when the fluid collides with the ring 5 by jetting from a narrowed portion to change the effective passing area of the channel 4. The load applied to the sheet ring 5 is arithmetically almost proportional to (amount of fluid hitting the sheet ring 5)×(flow velocity)$^2$. When the valve opening rate increases to a certain extent, the flow velocity decreases and therefore, deformation of the sheet ring 5 is very small. Thus, even if the effective passing area of a channel is changed due to the deformation of the sheet ring 5, the change can be ignored.

However, when the valve opening rate extremely decreases, the change of the effective passing area cannot be ignored. Moreover, when the valve opening rate deceases, the flow velocity of the fluid increases to accelerate the deformation of the sheet ring 5. Specifically, the load applied to the sheet ring 5 is generally maximized when the valve opening rate is approximately 15%.

However, when the closing rate of the valve disk 3 exceeds a limit, the value of (amount of fluid hitting the sheet ring 5) starts decreasing, the load applied to the sheet ring 5 does not increase even if (flow velocity) increases. Moreover, the load decreases as the value of (amount of fluid hitting the sheet ring 5) decreases. Then, the deformation of the sheet ring 5 decreases, the channel narrows, the effective passing area acceleratedly decreases, and the valve disk 3 closes. Therefore, the flow rate suddenly decreases from a certain level when the valve opening rate is 10% or less and moreover, the critical point changes depending on the then state (closing speed or temperature of the valve disk 3, specific gravity or viscosity of fluid, or presence or absence of vibration). Therefore, it is impossible to control a flow rate in accordance with a valve opening rate.

Moreover, as described above, the flow velocity of the conventional butterfly valve is maximized at a valve opening rate of approximately 15% immediately after the lateral end of the other side 3a of the valve disk 3 opens or immediately before it closes and the load applied to the sheet ring 5 is maximized in this case. Furthermore, the fluid collides with the sheet ring 5 located at the downstream side of the opening of the valve disk 3a so as to tear up the front end of the ring 5 in the form of a jet flow or turbulent flow. Therefore, there is a problem that the lateral end of the sheet ring 5 located at the other side 3a of the valve disk 3 is easily damaged.

It is an object of the present invention to provide a butterfly valve firstly having a characteristic capable of finely control a flow rate of 10% or less of the total flow rate and secondly almost preventing a sheet ring from damaging.

BRIEF SUMMARY OF THE INVENTION

The present invention is made to solve the above problems and provides a butterfly valve comprising a cylindrical valve body in which fluid flows from the upstream side toward the downstream side, a sheet ring fitted into the inner periphery of the valve body, a discoid valve disk for closing the valve by bringing the sealing surface of the outer periphery into close contact with the inner periphery of the sheet ring set in the valve body and opening the valve by rotation, and a rotatable shaft which is secured to the valve disk, penetrates the valve body, and is perpendicular to the flow direction of the fluid; in which a gap is produced between the sheet ring and the sealing surface of the valve disk from the lateral end to be rotated to the downstream side of the valve disk to start opening the valve disk when opening the valve by rotating the valve disk together with the shaft and the gap between the sheet ring and the sealing surface of the valve disk expands toward the lateral side which rotates toward the upstream side of the valve disk as the valve disk further opens.

By rotating the valve disk in the opening direction from the state in which the valve is closed, opening starts from the lateral side which rotates toward the upstream side of the valve disk and the gap opened in accordance with the rotation of the valve disk expands. When closing the valve, the above procedure is reversed.

In the process of opening or closing the valve, the load applied to the sheet ring due to the flow of the fluid is maximized when the valve opening rate is approximately 15% immediately after the valve opens or immediately before the valve closes. However, because the sheet ring is located at the upstream side of a position where a channel is most narrowed, it is not influenced by a jet flow or turbulent flow produced due to the narrowed channel.

Moreover, deformation of the sheet ring due to a high-speed fluid produced immediately after the valve opens or immediately before the valve closes is very small and therefore, it is possible to easily control a flow rate of 10% or less.

DETAILED DESCRIPTION

The first embodiment of the present invention is described below by referring to FIG. 1.

Figure 1A:
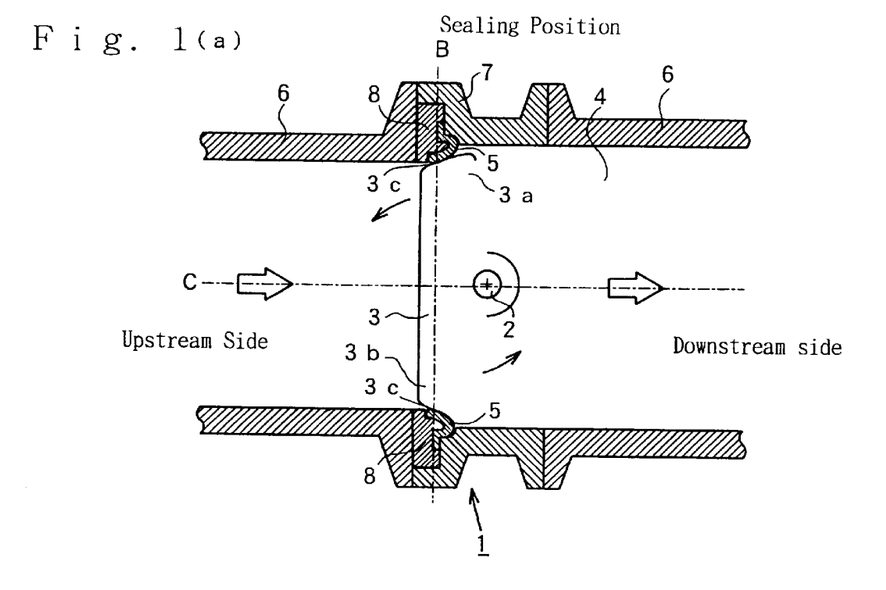
FIGS. 1(a) and 1(b) are sectional views of the first embodiment of a valve of the present invention.
Figure 1B:
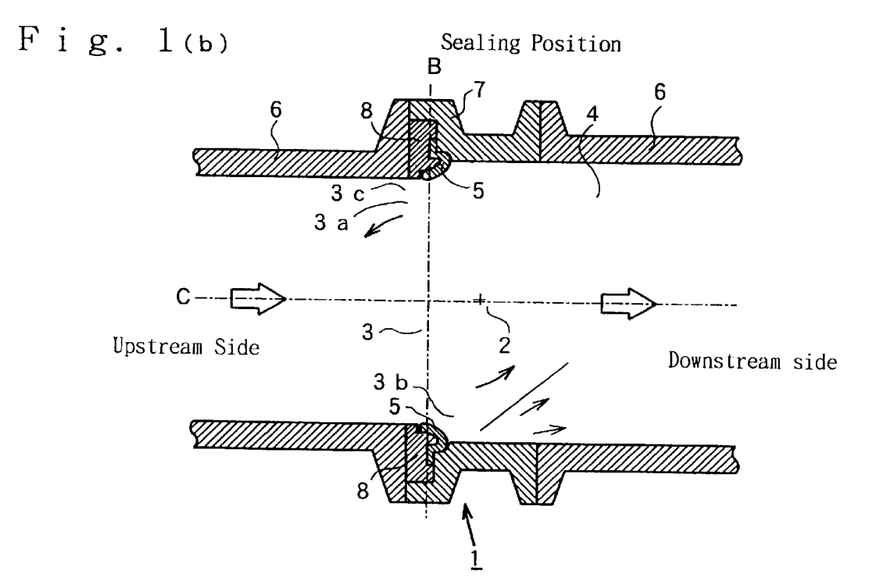

In FIG. 1, symbol 1 denotes a cylindrical valve body in which fluid flows from the primary side (upstream side) toward the secondary side (downstream side) through a channel 4 as shown by thick arrows and the valve disk 1 is constituted by securing a flange 7 to a pipe 6 by bolts and nuts (not illustrated). In the case of the valve disk 1, a sheet ring 5 made of an elastic material is fitted into a sealing position B on the inner periphery of the disk 1 by a holding ring 8 so that it is not removed. Moreover, a rotatable shaft 2 penetrating the valve disk 1 is set to a position (primary eccentricity) shifted to the downstream side of the sealing position B and a position (secondary eccentricity) slightly shifted to one side of the center line C of the channel 4 so that a handle (not illustrated) for opening or closing the valve and a drive unit (not illustrated) can be set to the outside of the valve disk 1.

A discoid valve disk 3 for closing the valve by bringing a sealing surface 3c into close contact with the inner periphery of the sheet ring 5 is secured to the shaft 2 by facing the sealing position B. One side 3a of the valve disk 3 rotates toward the upstream side and the other side 3b of it rotates toward the downstream side together with the shaft 2 to open the valve. The valve disk 3, as shown in FIG. 1, is formed so that the thickness of the one side 3a increases toward the downstream side compared to the other side 3b and a sealing surface 3c on the outer periphery is formed into a spherical surface about the center of the primary eccentric position.

For the above first embodiment, operations for opening and closing the valve are described below. When rotating the valve disk 3 by driving the shaft 2 by an external handle or drive unit from the closed state shown in Fig. 1(a), the sealing surface 3c at the end of the other side 3b of the valve disk 3 first separates from the sheet ring 5, a gap is produced, and opening of the valve starts as shown in FIG. 1(b). By further rotating the valve disk 3, the gap gradually expands toward the one side 3a and finally the sealing surface 3c at the end of the one side 3a separates from the sheet ring 5. Then, by further rotating the valve 3, the effective passing area increases and the valve fully opens at approximately 90°.

The valve is closed by reversing the above procedure.

In the process of opening or closing the valve, the load applied to the sheet ring 5 due to the flow of fluid is maximized when a valve opening rate is approximately 15% immediately after the valve shown in FIG. 1(b) opens or immediately before the valve closes. However, because the sheet ring 5 is located at the upstream side of a position where the channel 4 is most narrowed, the ring 5 is not influenced by a jet flow or turbulent flow due to the narrowed channel 4.

FIG. 7 shows flow-rate characteristic curves of a butterfly valve having a double eccentric structure according to the structure of the first embodiment. As shown by the flow-rate characteristic curves, an inflection point due to saturation of the flow rate is present nearby the position where the valve fully opens. However, when the valve opening rate is 90% or less, the flow rate reaches 0% while drawing an almost straight line and a gentle curve and there is no large inflection point. That is, even a flow rate of 10% or less can be controlled which cannot or can hardly be controlled conventionally.

The above first embodiment is a butterfly valve used when the flow direction of fluid is oriented from the flat side of the valve disk 3 toward the shaft-2 side (rightward on the drawing: hereafter referred to as forward direction) of it. A butterfly valve used when the flow direction of fluid is oriented from the shaft-2 side of the valve disk 3 toward the flat side (leftward on the drawing: hereafter referred to as backward direction) of it is constituted so that the sealing surface 3c at the end of the one side 3a of the valve disk 3 separates from the sheet ring 5 when opening the valve by setting the thicknesses of the one side 3a and the other side 3c of the valve disk 3 like the second embodiment shown in FIGS. 2(a) and 2(b) inversely to the case of the first embodiment.

Figure 2A:
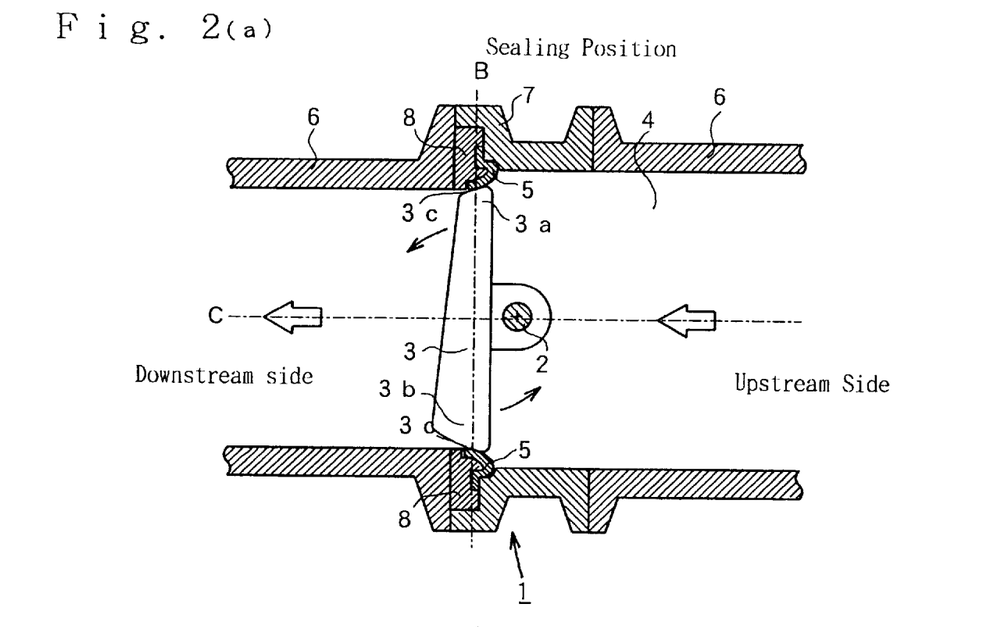
FIGS. 2(a) and 2(b) are sectional views of the second embodiment of a valve of the present invention.
Figure 2B:
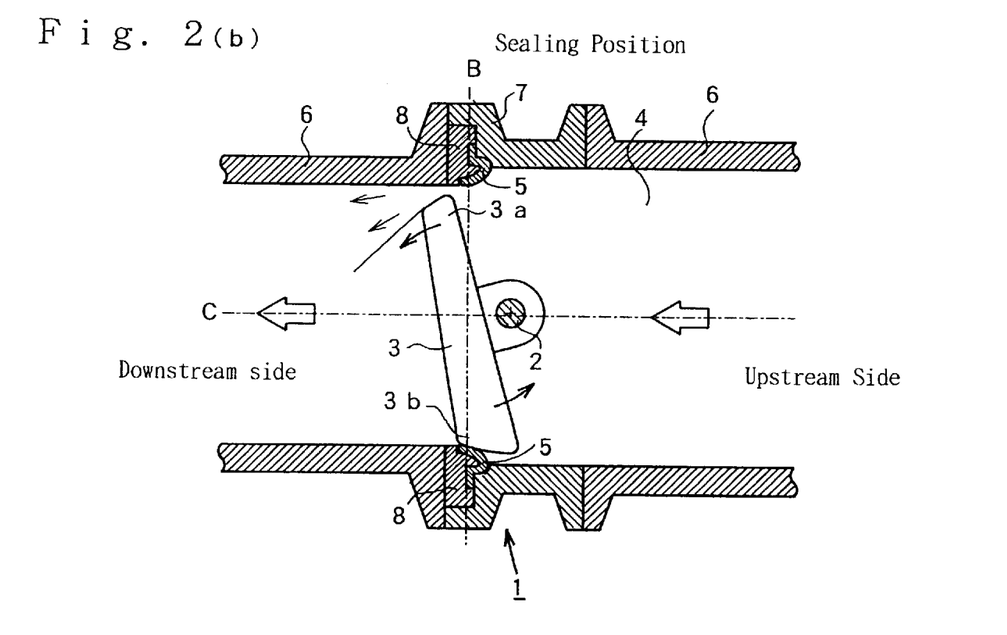

In the case of the second embodiment, by rotating the valve disk 3 in the opening direction from the closed state shown in FIG. 2(a), the sealing surface 3c at the end of the one side 3a of the valve disk 3 first separates from the sheet ring 5 and a gap is formed, the gap gradually expands toward the other side 3b, and finally the sealing surface 3c at the end of the other side 3b separates from the sheet ring 5. In the process of opening the valve, the load applied to the sheet ring 5 due to the flow of fluid is maximized immediately after the valve shown in FIG. 2(b) opens. However, the sheet ring 5 is not influenced by a jet flow or turbulent flow due to the narrowed channel 4 similarly to the case of the first embodiment.

The above first and second embodiments are constituted so that the thickness of one side 3a or other side 3b of the valve disk 3 increases. However, it is also possible to form the valve disk 3 so that the thickness of the disk 3 entirely increases toward the flow direction of fluid.

Figure 3A:
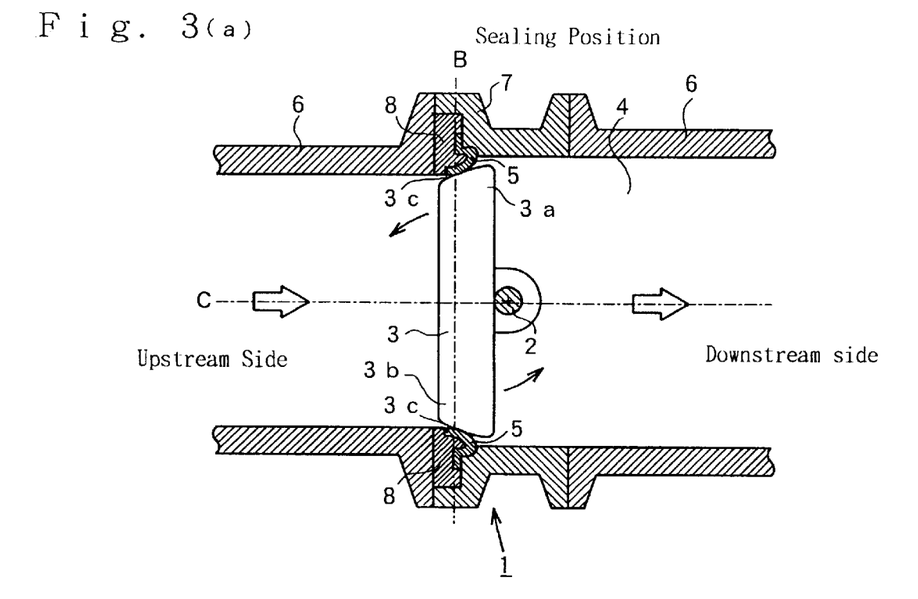
FIGS. 3(a) and 3(b) are sectional views of the third embodiment of a valve of the present invention.
Figure 3B:
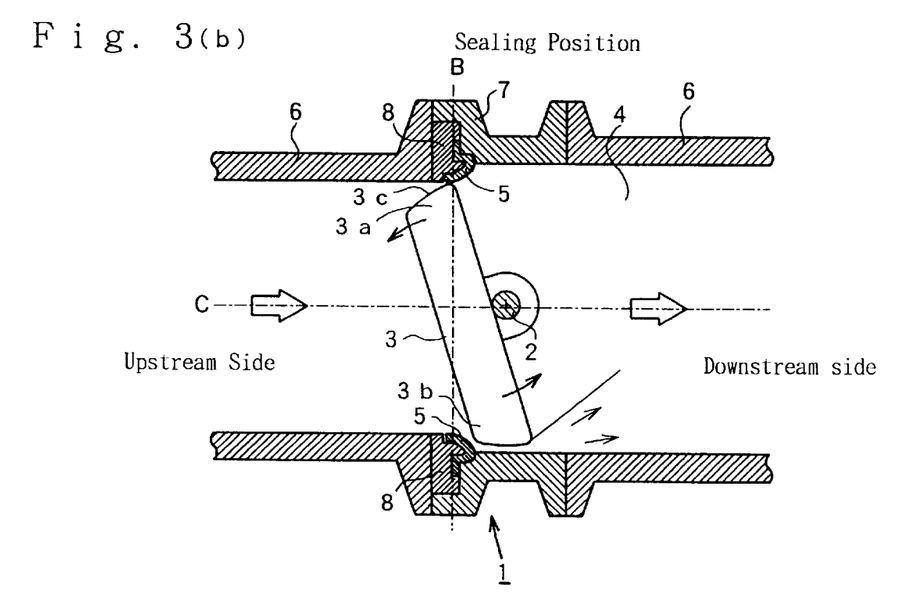
Figure 4A:
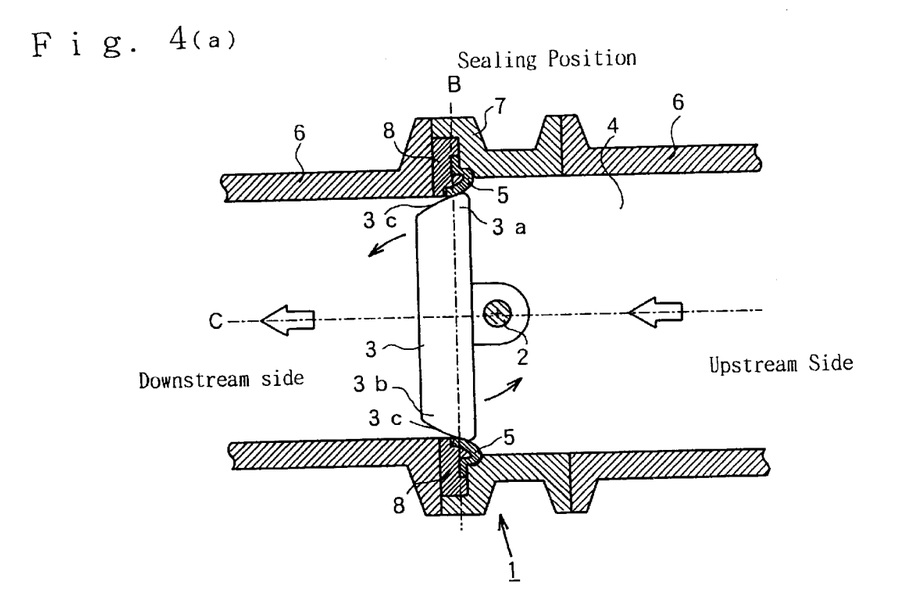
FIGS. 4(a) and 4(b) are sectional views of the fourth embodiment of a valve of the present invention.
Figure 4B:
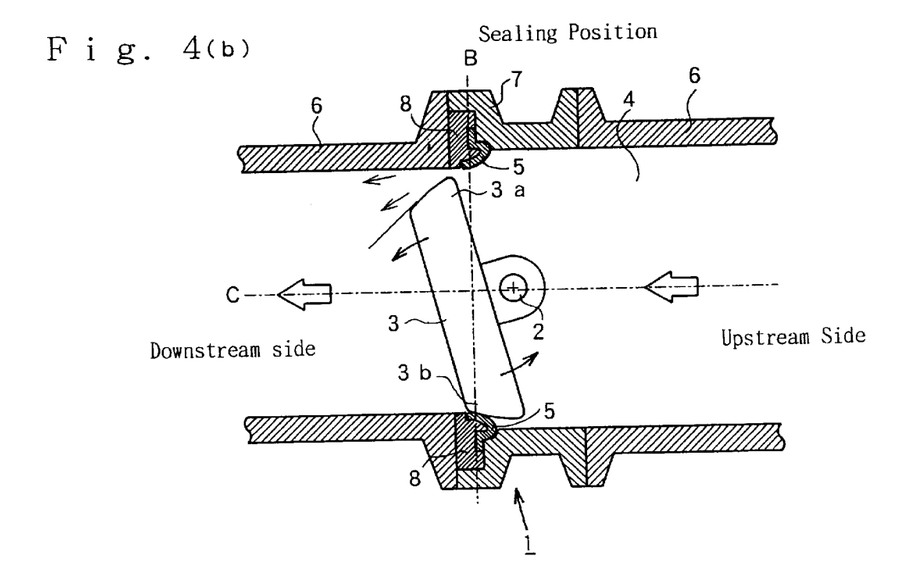

That is, the butterfly valve used when the flow direction of fluid is forward is formed so that the thickness of the valve disk 3 increases toward the shaft-2 side (rightward on the drawing) as shown by the third embodiment in FIG. 3. The butterfly valve used when the flow direction of fluid is backward is formed so that the thickness of the valve disk 3 increases toward the opposite side to the shaft 2 (leftward on the drawing) as shown by the fourth embodiment in FIG. 4.

In the case of these third and fourth embodiments, the thickness of a portion of the valve disk 3 not contacting the sheet ring 5 is only increased when the valves of the first and second embodiments are opened and closed. Therefore, the operations of opening and closing the valve are completely the same as the case of the first and second embodiments though flow rate characteristics may slightly be different from those of the first and second embodiment. Therefore, the third and fourth embodiment can easily be manufactured compared to the first and second embodiments because it is unnecessary to taper the valve disk 3 in thickness.

Figure 5A:
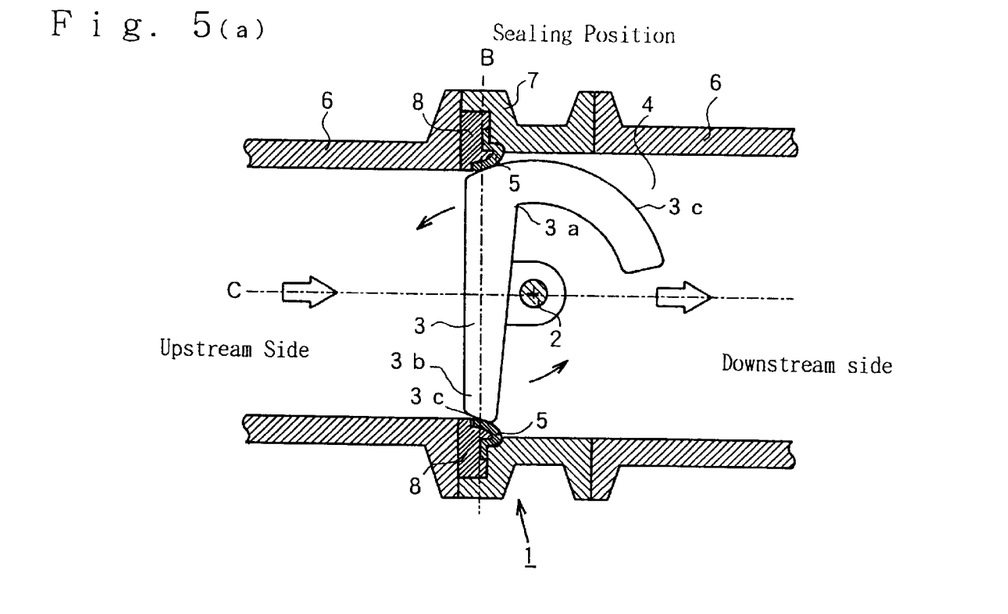
FIGS. 5(a) and 5(b) are sectional views of the fifth embodiment of a valve of the present invention.
Figure 5B:
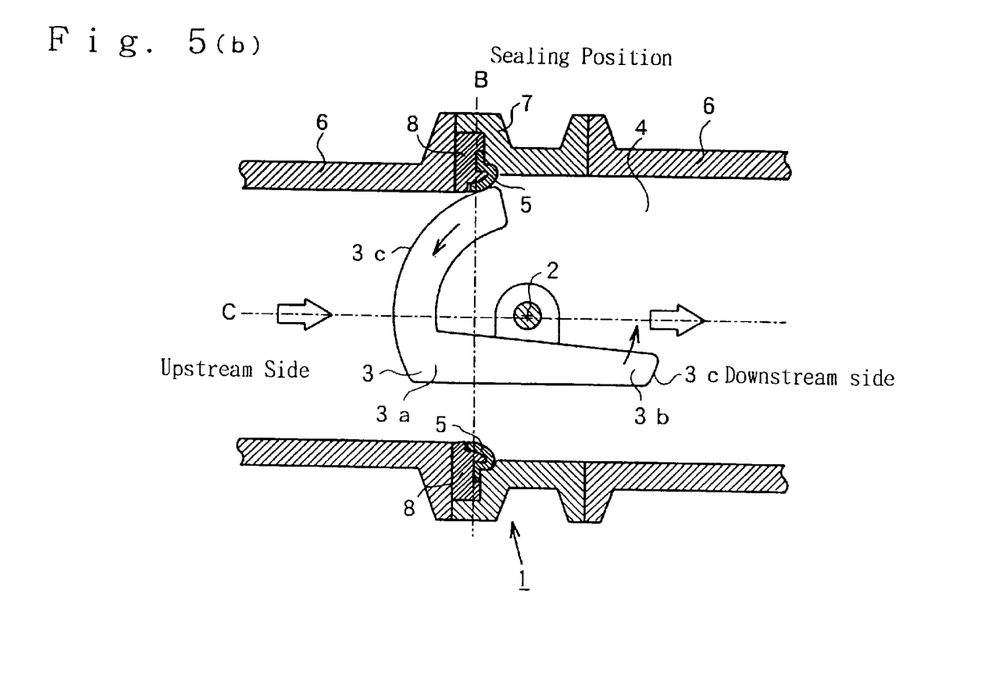
Figure 6A:
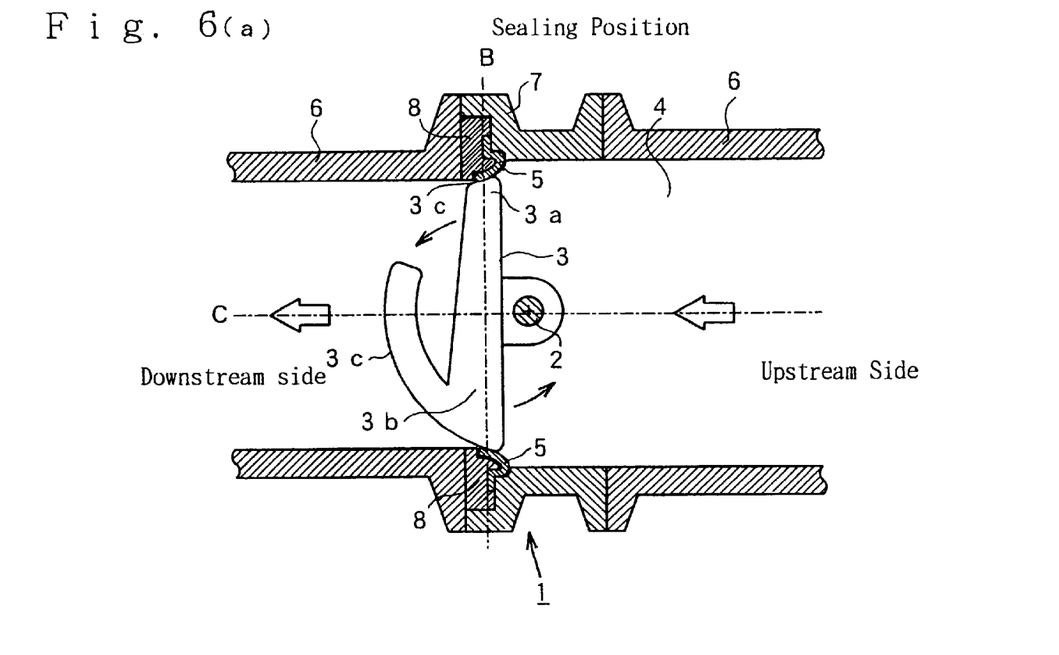
FIGS. 6(a) and 6(b) are sectional views of the sixth embodiment of a valve of the present invention.
Figure 6B:
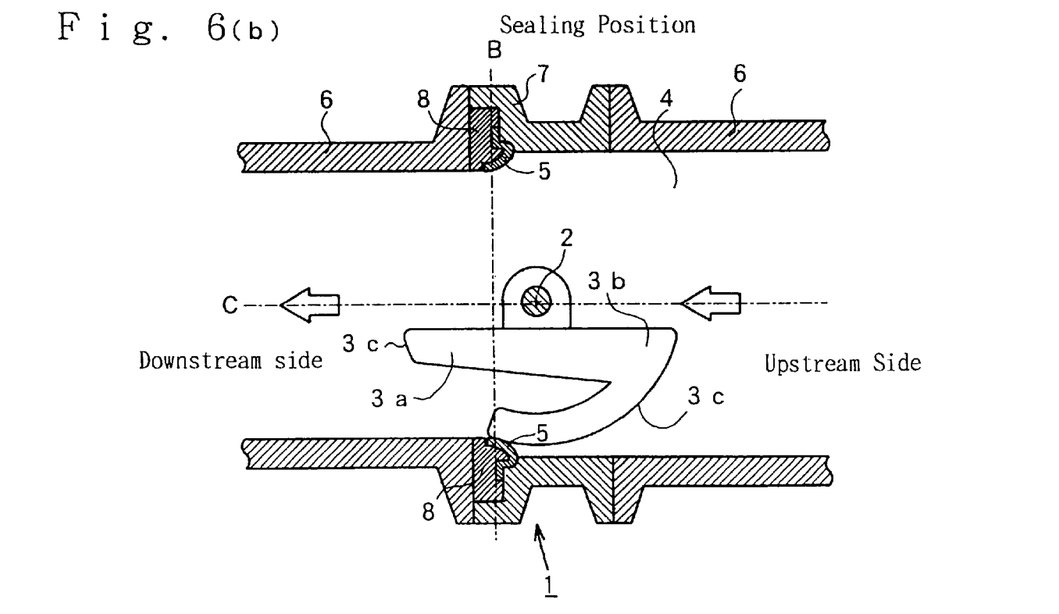

The above first to fourth embodiments are constituted so that the side of the valve disk 3 to be rotated in the direction not going against the flow direction of fluid first separates from the sheet ring 5 when opening the valve. However, it is also possible to constitute the embodiments so that the side of the valve disk 3 to be rotated in the direction going against the flow direction of fluid does not separate from the sheet ring 5 even when the valve fully opens as shown in FIGS. 5 and 6.

By using the above structure, it is possible not only to stably control a very small amount of fluid only when a valve slightly opens but also to stably control a very small amount of fluid in the whole range in accordance with the usage or purpose.

Figure 8:
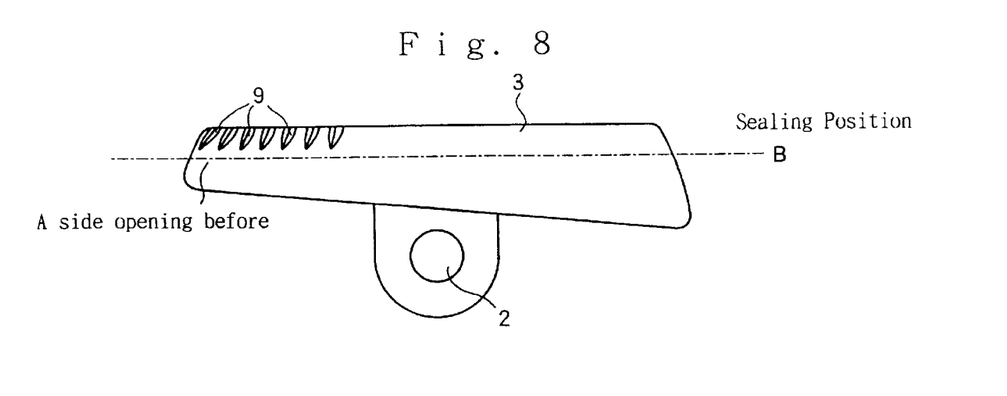
FIG. 8 is a top view showing a valve disk in which grooves are formed along the flow direction of fluid.
Figure 9:
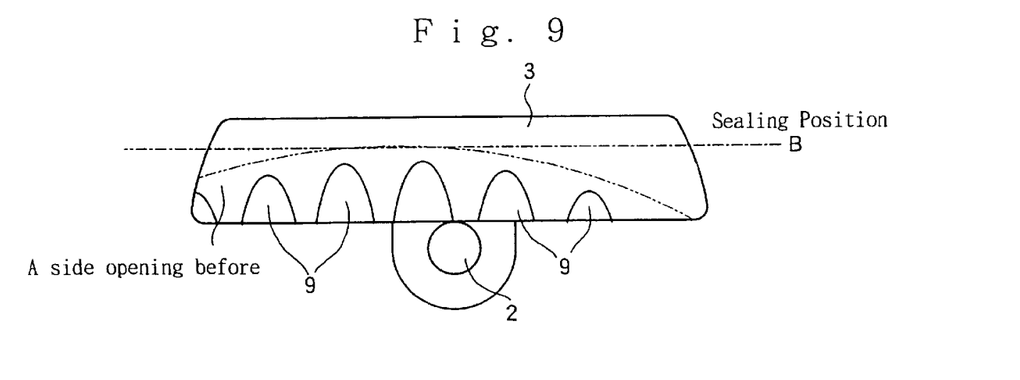
FIG. 9 is a top view showing another valve disk in which grooves are formed along the flow direction of fluid.

In the case of the above embodiments, a side to be opened before the valve disk 3 opens is determined by the thickness of the disk 3 or the like. However, the present invention is not restricted to the above manner. It is also possible to form the grooves 9 on a valve disk along the flow direction of fluid so that opening starts from the grooves 9 when opening the valve or the grooves 9 at a side to be opened before the valve disk 3 opens in addition to the structure of each of the above embodiments as shown in FIGS. 8 and 9.

By changing the number of the grooves 9 or arrangement of them, it is possible to obtain a desired characteristic by controlling flow rate characteristics at a very small flow rate of 10% or less or adjust a flow by preventing a small turbulent flow from occurring at a very small flow rate.

Figure 10:
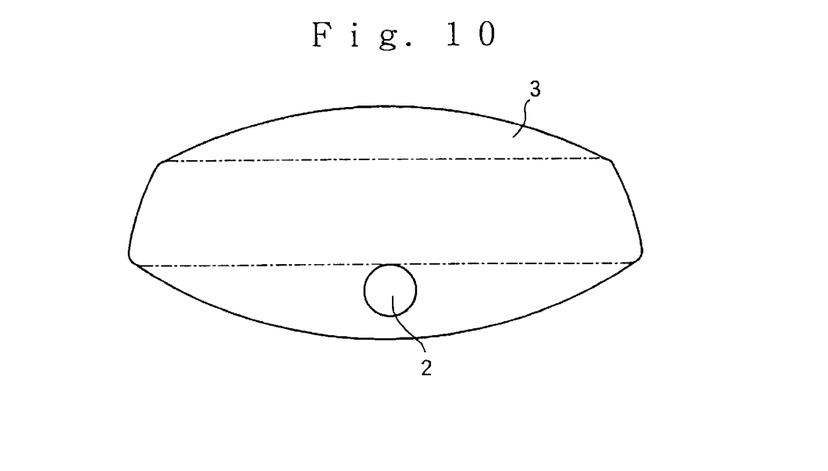
FIG. 10 is a top view showing a valve disk formed into a streamline shape.

Moreover, as shown in FIG. 10, it is possible to form the both sides of the valve disk 3 into a streamline shape and prevent a large turbulent flow from occurring. In this case, however, the maximum flow rate when a valve fully opens may be decreased.

Each of the above embodiments shows a butterfly valve having a double eccentric structure in which the shaft 2 of the valve disk 3 is set to a position shifted from the sealing plane B and a position slightly shifted also from the center line C of the channel 4. However, the present invention can be applied not only to the above butterfly valve but also to a butterfly valve having an eccentric structure in which the shaft 2 is shifted from the sealing plane B on the center line C of the channel 4, a butterfly valve having an eccentric structure in which the shaft 2 is shifted from the center line C of the channel 4 on the sealing plane B, or a butterfly valve having no eccentric structure. Even when the present invention is applied to these butterfly valves, there is no structural difference except the difference between eccentric structures.

Moreover, in the case of the above embodiments, the amount of materials increases by a value equivalent to the increase of the thickness of the valve disk 3 and thereby, the weight also increases by a value equivalent to the increase of the thickness. Therefore, it is permitted to hollow out the valve disk 3 though the manufacturing difficulty slightly increases. Moreover, it is permitted to form the valve disk 3 so as to scoop out the downstream side of the disk 3 in the flow direction of fluid as a simple way. In this case, however, a turbulent flow easily occurs. However, the turbulent flow is not a turbulent flow which influence and damages the sheet ring 5. Because the valve disk 3 is generally made of a casting, it is possible to easily form the disk 3 so as to scoop out one side of it.

Moreover, in the case of the above embodiments, the sealing surface 3c at outer periphery of the valve disk 3 is formed into a spherical surface about the center of the primary eccentric position. However, it is also permitted to form the surface 3c into a similar spherical surface or a conical surface.

Because the present invention is constituted so that a valve disk opens from the side to be rotated in the direction not going against the flow direction of fluid when a valve opens as described above, a jet flow or turbulent flow due to a high-speed fluid produced immediately after the valve opens or immediately before the valve closes does not hit a sheet ring and therefore, it is possible to prevent the sheet ring from damaging. Moreover, because deformation of the sheet ring due to a high-speed fluid produced immediately after the valve opens or immediately before the valve closes is very small, there is an advantage that a flow rate of 10% or less can be controlled.

Furthermore, by forming grooves on the valve disk along the flow direction of fluid so that opening starts from the grooves when opening the valve, it is possible to obtain a desired characteristic by controlling flow rate characteristics at a very small flow rate of 10% or less and adjust a flow by preventing a small turbulent flow at a very small flow rate from occurring.

Furthermore, by forming the both sides of the valve disk into a streamline shape, it is possible to prevent a large turbulent flow from occurring.

What is claimed is:

1. A butterfly valve comprising:
   a stepped cylindrical valve body through which fluid flows, said stepped cylindrical valve body having a first diameter upstream portion, a second diameter downstream portion and a center line which extends coaxially through both of the first diameter upstream portion and the second diameter downstream portion;
   a sheet ring attached to the inner surface of said valve body, said sheet ring being located in said cylindrical body at a step between the first diameter upstream portion and the second diameter downstream portion, said sheet ring having an inner diameter essentially the same as a smaller of the first diameter upstream portion and second diameter downstream portion;
   a rotatable shaft which extends through a larger of the first diameter upstream portion and second diameter downstream portion so as to be rotatable about an axis which is offset from the center line; and
   a valve member of a generally disk-like shape secured to said shaft, said valve member having a first semi-circular half having a first curved sealing surface on an outer periphery thereof, and a second semi-circular half having a second curved sealing surface along an outer periphery thereof, said shaft and said valve member being offset from one another such that during a first initial rotation of said shaft through a predetermined small angle from a closed position wherein the first curved surface and the second curved surface are both in engagement with said sheet ring, the first half rotates towards the downstream portion, separates from the sheet ring and moves with respect to a wall portion of the second diameter downstream portion of the stepped cylindrical valve body to establish a small gap through which fluid can initially flow while the second half remains in contact with the sheet seal as it rotates towards the upstream side, and thus limit the amount of flow past the valve member to a controlled small amount and protect the sheet ring from damage by a sudden large change in flow amount.

2. The butterfly valve according to claim 1, wherein the first sealing surface has a width and the second sealing surface has a width, and wherein at least the width of the second sealing surface is greater than the width of the first sealing surface.

\* \* \* \* \*

UNITED STATES PATENT AND TRADEMARK OFFICE
CERTIFICATE OF CORRECTION

PATENT NO. : 6,131,882
DATED : October 17, 2000
INVENTOR(S) : Yoshikazu Suzuki

It is certified that error appears in the above-identified patent and that said Letters Patent is hereby corrected as shown below:

Title page,
The title page, showing the illustrative figure, should be deleted and substitute therefore the attached title page.

Drawings,
The drawing sheet, consisting of Figs. 1(a) and 1(b) should be deleted to be replaced with the drawing sheet, consisting of Figs. 1(a) and 1(b), as shown on the attached page.

Signed and Sealed this

Sixteenth Day of April, 2002

Attest:

Attesting Officer

JAMES E. ROGAN
Director of the United States Patent and Trademark Office

United States Patent [19]
Suzuki

[11] Patent Number: 6,131,882
[45] Date of Patent: Oct. 17, 2000

[54] BUTTERFLY VALVE

[75] Inventor: Yoshikazu Suzuki, Shizuoka-ken, Japan

[73] Assignees: NBS Co., Ltd., Shizuoka-ken; Kazuhiro Miyairi, Kanagawa-ken, both of Japan

[21] Appl. No.: 08/768,453

[22] Filed: Dec. 18, 1996

[30] Foreign Application Priority Data

Dec. 19, 1995 [JP] Japan .................... 7-348691

[51] Int. Cl.$^7$ ........................... F16K 1/226
[52] U.S. Cl. ........................ 251/306; 251/305
[58] Field of Search ..................... 251/305, 306

[56] References Cited

U.S. PATENT DOCUMENTS

| | | | |
|---|---|---|---|
| 2,095,263 | 10/1937 | Moss | 251/305 X |
| 2,662,545 | 12/1953 | Kelley | 251/305 X |
| 3,176,704 | 4/1965 | De Palma | 251/305 X |
| 3,960,177 | 6/1976 | Baumann | 251/305 X |
| 4,281,817 | 8/1981 | Adams et al. | 251/305 |
| 4,296,915 | 10/1981 | Baumann | 251/306 X |
| 4,712,768 | 12/1987 | Herr et al. | 251/305 |
| 4,796,857 | 1/1989 | Hayes et al. | 251/306 X |
| 5,102,097 | 4/1992 | Davis et al. | 251/305 X |

*Primary Examiner*—John Fox
*Attorney, Agent, or Firm*—McDermott, Will & Emery

[57] ABSTRACT

A butterfly valve comprising a cylindrical valve body (1), a sheet ring (5) fitted into the inner periphery of the valve body (1), and a discoid valve discoid valve disk (3) for opening or closing the valve. When the valve is opened by rotating the valve disk (3), a gap forms at the half of the valve disk (3) that is rotated downstream between the sheet ring (5) and the sealing surface (3c) of the valve disk (3). The gap between the sheet ring (5) and the sealing surface (3c) of the valve disk (3) expands and a second gap is formed at the half of the valve disk (3) that is rotated upstream between the sheet ring (5) and the sealing surface (3c) as the valve disk (3) further opens. The sheet ring (5) is not influenced by turbulent flow produced due to a narrowed channel (4) because the sheet ring (5) is positioned to the upstream side of a position where the channel (4) is most narrowed when a valve opening rate is approximately 15% in which the load applied to the sheet ring (5) due to fluid is maximized. Thereby, a butterfly valve can be obtained which has characteristic capable of precisely controlling a flow rate of 10% or less of the total flow rate.

2 Claims, 9 Drawing Sheets

Fig. 1(a)

Fig. 1(b)